COMPACTING APPARATUS FOR MAGNETIC POWDERS

Filed April 15, 1968 7 Sheets-Sheet 2

COMPACTING APPARATUS FOR MAGNETIC POWDERS 3,555,621
COMPACTING APPARATUS FOR MAGNETIC POWDERS

Ei Hara, Urawa-shi, Japan, assignor to Tamagawa Kikai Kinzoku Kabushiki Kaisha, Tokyo-to, Japan Filed Apr. 15, 1968, Ser. No. 721,494
Claims priority, application Japan, Apr. 22, 1967, 42/25,668, 42/25,669; Apr. 26, 1967, 42/26,796; Aug. 8, 1967, 42/50,805; Aug. 24, 1967, 42/54,329
Int. Cl. B30b *11/04*
U.S. Cl. 18—16.5 17 Claims

ABSTRACT OF THE DISCLOSURE

A compacting apparatus for magnetic powder, wherein the magnetic powder is molded under pressure while particles thereof are oriented in the desired direction by the action of magnetic flux, is divided into separable upper and lower sections so as to facilitate charging of the magnetic powder into the mold cavity and removal of molded magnets.

BACKGROUND OF THE INVENTION

This invention relates to an apparatus for compacting magnetic powder to produce permanent magnets.

Permanent magnets are often prepared by compacting powder of magnetic material such as ferrite and barium ferrite, and the methods of compacting such magnetic powder can be classified into the dry process and the wet process. According to the wet process, magnetic powder is suspended in a liquid such as methyl alcohol or an aqueous solution of polyvinyl alcohol, and the liquid is injected into a metal mold. While contained in the mold, the magnetic powder is subjected to magnetic field or flux whereby particles of the magnetic material are oriented in the direction of their electrical axes or *c* axis. As particles suspended in liquid can be freely rotated (mobilized) by the magnetic field to align in the direction thereof, the magnetic characteristics of permanent magnets prepared by molding under pressure such highly oriented particles can be improved. However, as it takes a considerable time to remove the liquid from the mold, the wet process is not suitable for mass production. On the other hand, according to the dry process, particles of magnetic material cannot rotate as freely as in the wet process, thus degrading the magnetic characteristics of the molded (compacted) permanent magnets.

Further, a conventional molding apparatus utilized in the dry process comprises an annular exciting coil of relatively long axial length, a magnetic core encircling the coil, a hollow center leg made of non-magnetic material and extending through the window of the coil. To mold a magnet, a predetermined quantity of magnetic material is charged into the space in the hollow center leg at the middle of its axial length or at the place where the intensity of magnetic flux created by the exciting coil is maximum. After orientating the particles of the magnetic powder in the direction of magnetic flux, the powder is molded by means of plungers or die members inserted in the hollow center leg. Thereafter, the molded magnet is raised above the upper surface of the magnetic core by raising the lower die member.

Thus, with ithis construction,, the stroke of die members is relatively long. In addition, the molded magnet is liable to be damaged by the friction created when it is raised from the middle portion in the coil. Further, as a single exciting coil is used, it is necessary to apply a high voltage across it in order to create magnetic flux of sufficient intensity. Further, although such a molding apparatus can provide magnets which are magnetized in their axial direction, it is not capable of producing magnets which are magnetized in the radial direction.

SUMMARY OF THE INVENTION

Accordingly, it is an object of this invention to provide a novel compacting apparatus for magnetic powder whereby the stroke of die members and, hence, possibility of damage of the molded magnets due to friction can be reduced.

Another object of this invention is to provide a compacting apparatus for magnetic powder wherein the particles of magnetic powder can be more freely and more uniformly oriented in the direction of magnetic flux, thus improving the magnetic characteristics of molded magnets.

Yet another object of this invention is to provide magnets magnetized in the radial direction.

A further object of this invention is to provide a molding (compacting) apparatus for producing annular magnets having discrete poles magnetized in the radial direction.

According to this invention, the molding (compacting) apparatus for magnetic powder is divided into substantially identical upper and lower sections. Each section includes at least one exciting coil and at least one magnetic core substantially surrounding the coil. To mold axially magnetized permanent magnets, exciting coils are made annular, and the magnetic cores are formed with annular central legs extending through the window of the annular coils. Plungers or die members are inserted in the bores of the central legs. A mold cavity is defined by the upper end of the lower die member and the upper portion of the bore in the central leg.

After a predetermined quantity of magnetic powder has been charged into the mold cavity, the upper section is mounted on the lower section, and then the exciting coils of both sections are excited to create magnetic flux that flows axially through said die members and the magnetic powder contained in the mold cavity to orient the particles thereof in the direction of the magnetic flux. Thereafter, pressure is applied to the die members to mold the powder. After removing the upper section, the molded magnet can be removed by removing the lower die member slightly upward.

To facilitate orientation of the magnetic particles, according to one feature of this invention, air or gas is introduced into the mold cavity to fluidize the magnetic powder contained therein.

According to a modified embodiment of this invention, the central leg of the upper magnetic core is made solid, and a die assembly including a plurality of radially movable die members is interposed between the upper and lower sections. In this modification, the mold cavity is defined by the upper end of the lower core rod and said radial die members.

According to another modification of this invention, core rods are inserted in the hollow center legs of the magnetic cores but spaced apart therefrom, and cylindrical die members are inserted between the central legs and core rods. The mold cavity is defined by the core rod, the upper yokes of the magnetic cores, and the cylindrical die member of the lower section. In this case exciting coils of the upper and lower sections are excited to create magnetic flux which flows through the upper yoke of the lower magnetic core and across the molding cavity in the radial direction with respect to the axis of the core rod, thus producing annular magnets magnetized in the radial direction.

Alternatively, the magnetic core and the exciting coil in each section may be divided into a plurality of C shaped cores and coils associated therewith to form a plurality of discrete magnetic poles on the molded magnets.

BRIEF DESCRIPTION OF THE DRAWINGS

The invention can be more fully understood from the following description when taken in conjunction with the accompanying drawings in which.

DESCRIPTION OF THE PREFERRED EMBODIMENTS

Figure 1:
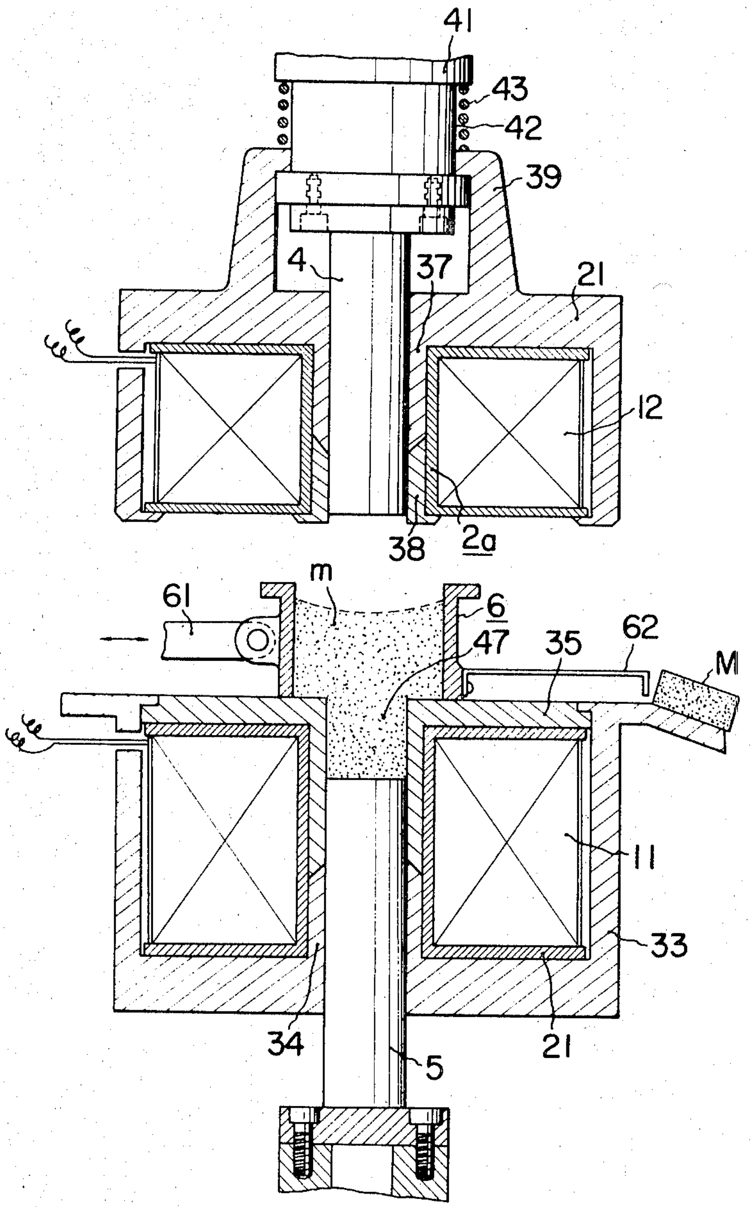
FIG. 1 is a longitudinal section of an example of the molding apparatus of this invention showing the manner of charging magnetic powder.
Figure 2:
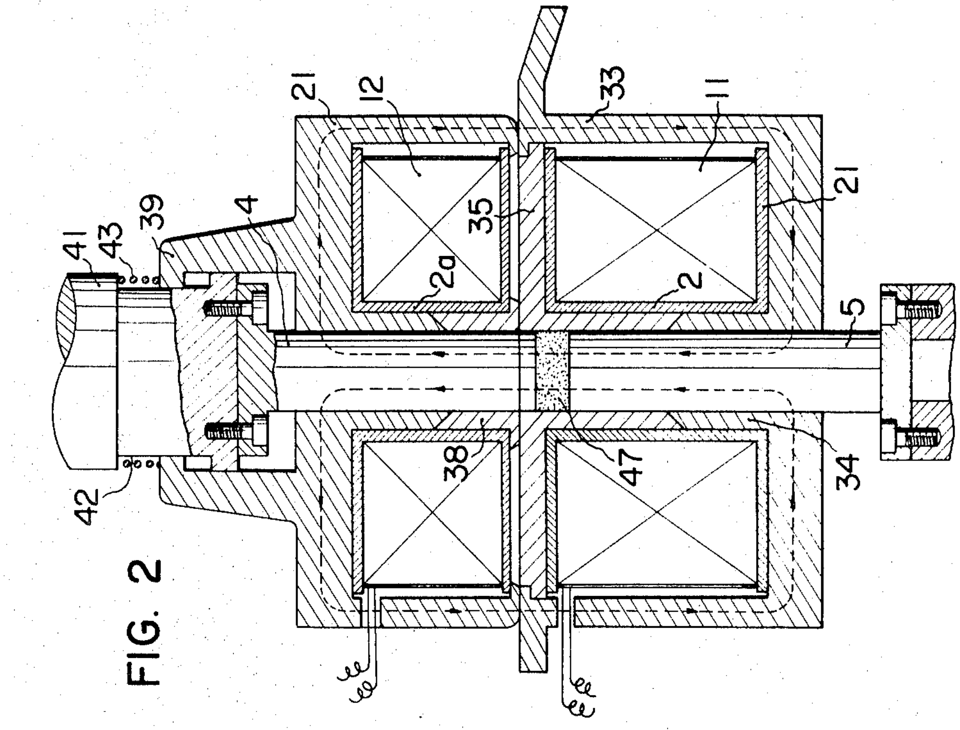
FIG. 2 is a similar view showing the molding apparatus shown in FIG. 1 in the molding state.

As shown in FIGS. 1 and 2 of the accompanying drawings, the molding apparatus of this invention is divided into an upper section and a lower section. The lower section comprises an annular exciting coil 11 wound upon a non-magnetic bobbin 21 contained in a magnetic core 33. Core 33 is provided with a hollow central leg 34 having a central bore receiving a lower plunger or die member 5. The upper portion of the central leg 34 and an upper yoke 35 are made of non-magnetic material. The upper section comprises an annular exciting coil 12 also wound upon a non-magnetic bobbin 2*a*. Coil 12, except the lower side thereof, and bobbin 2*a* are enclosed by a magnetic core 21. A hollow central leg 37 having a bore is provided to receive an upper plunger or die member 4, the lower portion 38 of the central leg 37 being made of non-magnetic material. A hollow upright retaining member 39 is provided on the upper surface of core 21 to engage a reduced diameter portion 42 of an operating rod 41 for the upper die member. The operating rod 41 and upper die member are biased upwardly by a spring 43 surrounding the reduced diameter portion 42.

When the upper section of the molding apparatus is separated from the lower molding section as shown in FIG. 1, a powder feed box 6 is brought to the position shown to charge a mold cavity 47 defined by the bore in the centrol leg 34 above the lower die member 5 with a powder of magnetic material *m*, ferrite for example. The feed box is reciprocated along the upper surface of non-magnetic yoke 35 of the lower core by means of a rod 61 and is provided with a push member 62 at its front side to remove the molded permanent magnet M. Then the feed box is moved to the left, and the upper section of the molding apparatus is lowered to engage the lower section as shown in FIG. 2. At this time coils 11 and 12 are energized in the same direction to create magnetic flux, which circulates through a magnetic path including upper and lower plungers or die members 4 and 5, and magnetic cores 33 and 21, thus magnetizing the magnetic powder *m* contained in molding cavity 47 defined by plungers 4 and 5 and the bore of lower central leg 34.

As a result, respective particles of the magnetic powder are orientated in the direction of the magnetic flux. The central cylindrical portion of non-magnetic yoke 35 and non-magnetic cylinder 38 effectively shield the magnetic flux to concentrate it on the magnetic powder *m*. Thereafter, the upper and lower plungers are forced against the magnetic powder by means of a suitable press, not shown, to mold the powder to produce a permanent magnet M.

With this molding apparatus, particles of the molded magnet are highly orientated, thus providing magnets of high quality.

In a prior molding apparatus for magnetic powder, a single elongated cylindrical winding is used and the powder is molded at the center of an axial bore extending through the coil, or at the portion of the maximum flux intensity, by means of upper and lower plungers, so that these plungers are required to have a long stroke.

In contrast, the molding apparatus according to this invention is divided into separable upper and lower sections, whereby it is possible to reduce the stroke of the plungers or die members. In addition, as the molded product can be readily removed from the mold cavity, damage thereto due to large axial movement can be minimized.

Figure 3:
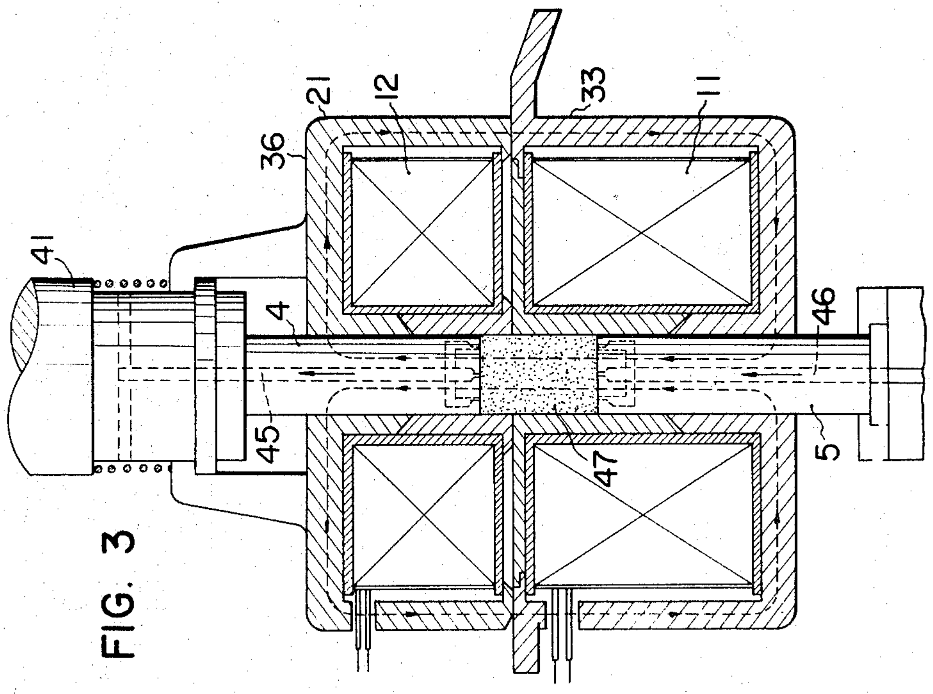
FIG. 3 is a view corresponding to FIG. 2 which shows a modified embodiment of this invention.

In the modification shown in FIG. 3, air ducts 45 and 46 are provided through plungers 4 and 5, respectively, through which air or other suitable gas is passed under pressure as shown by solid line arrows to fluidize magnetic powder contained in the mold cavity 47. In this case the height of the mold cavity is somewhat larger than that shown in FIG. 2 to facilitate fluidization. In the fluidized state, the particles of magnetic powder can be more readily oriented in the direction of their *c* axes when magnetized by the magnetic flux created by exciting coils 11 and 12. As mentioned hereinabove, the magnetic characteristics of a permanent magnet prepared by molding a powder of magnetic material under pressure and magnetic field can be enhanced when the individual particles or elementary magnets are orientated in their *c* axes. Fluidization of the magnetic powder reduces friction between the particles and thus assures more uniform orientation and excellent magnetic characteristics.

To uniformly distribute compressed air in the mold cavity, the inner ends of plungers 4 and 5 may be provided with a number of nozzles as shown by dotted lines. Alternatively, air passages may be provided for the hollow central legs of magnetic cores 21 and 33.

After fluidization, pressure is applied to plungers 4 and 5 to move them toward each other to mold the orientated magnetic powder.

The construction and operation of the other components of FIG. 3 are identical to those of FIG. 2.

FIGS. 4 through 8 illustrate another embodiment of this invention which employs an independent die assembly to be disposed between the upper and lower sections of the molding apparatus. The moulding apparatus shown in these figures is also divided into upper and lower sections. The upper section comprises an annular exciting coil 51 wound upon a bobbin 52 of non-magnetic material, which is surrounded by a core 53 of magnetic material. The core has a solid central leg 54 extending through the window of exciting coil 51, and the lower side of coil 51 is closed by an annular plate 55 of non-magnetic material extending between the lower ends of central leg 54 and core 53. An upright projection 56 of casing 53 is connected to an operating rod 57 actuated by a press, not shown.

The lower section comprises an exciting coil 58 wound upon a bobbin 59 which is surrounded by a cup-shaped core 60 of magnetic material. The hollow central leg of the core is provided with an axial bore 61 adapted to slidably receive a plunger 62. The central leg is preferably made of non-magnetic material. The upper side of coil 58 is closed by a non-magnetic annular plate 62 extending between the upper ends of the central leg and the outer wall of the core 60.

Figure 6:
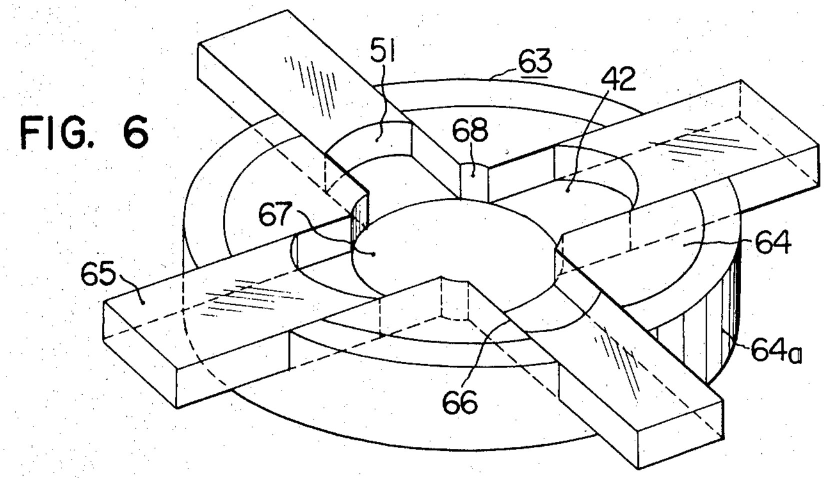
FIG. 6 is a perspective view of one form of the die assembly.

Mounted upon annular plate 62 is a die assembly 63 comprising a disc shaped die holder 64 of non-magnetic material surrounded by an annular ring 64*a* of magnetic material and a plurality of radial die pieces 65 of non-magnetic material slidably received in radial slots 66 on the upper surface of die holder 64 and annular ring 64*a*, as shown in FIG. 6. A circular opening 67 is provided at the center of the die holder, and the inner surfaces of die pieces 65 and the surface 68 between adjacent slots 66 are machined to form a circular opening contiguous to opening 66 when die pieces 65 are moved inwardly, thus defining a circular disc shaped mold cavity.

Figure 7:
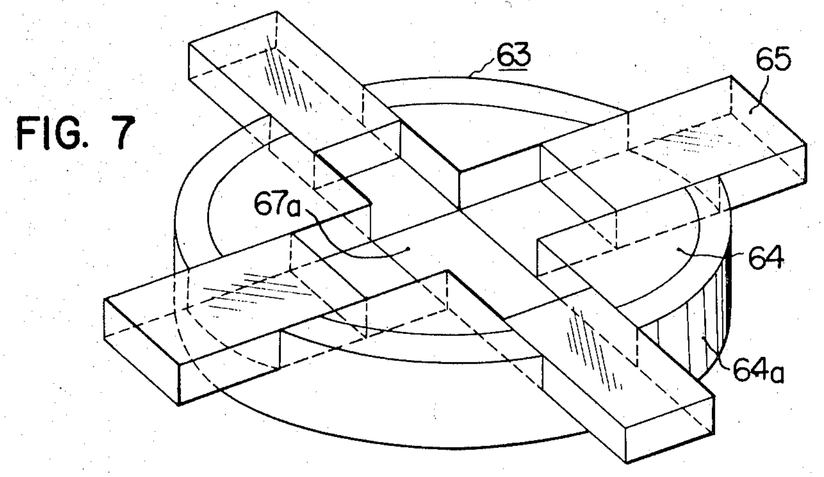
FIGS. 7 and 8 are perspective views showing modified die assemblies.
Figure 8:
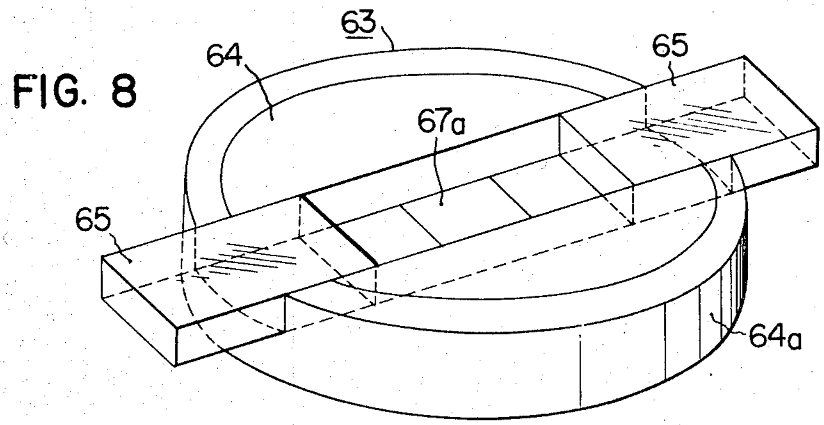

In the modified die assembly shown in FIG. 7 the configuration of central opening 67*a* through die holder 64 is square so that the inner end of each die piece 65 is cut straightly in parallel with each side edge of opening 67*a*, thus defining a mold cavity of square cross-section. In the embodiment shown in FIG. 8, the number of die pieces 65 is reduced to two to define a mold cavity having the same configuration as that shown in FIG. 7.

As diagrammatically shown in FIG. 4, while the upper section of the molding apparatus is spaced apart from the lower section, a powder feed box 68 is positioned to charge magnetic powder *m* into the mold cavity in the same manner as has been described in connection with FIGS. 1 and 2. The feed box 68 is also provided with a push member 69 to remove the molded permanent magnet M.

Figures 4, 5:
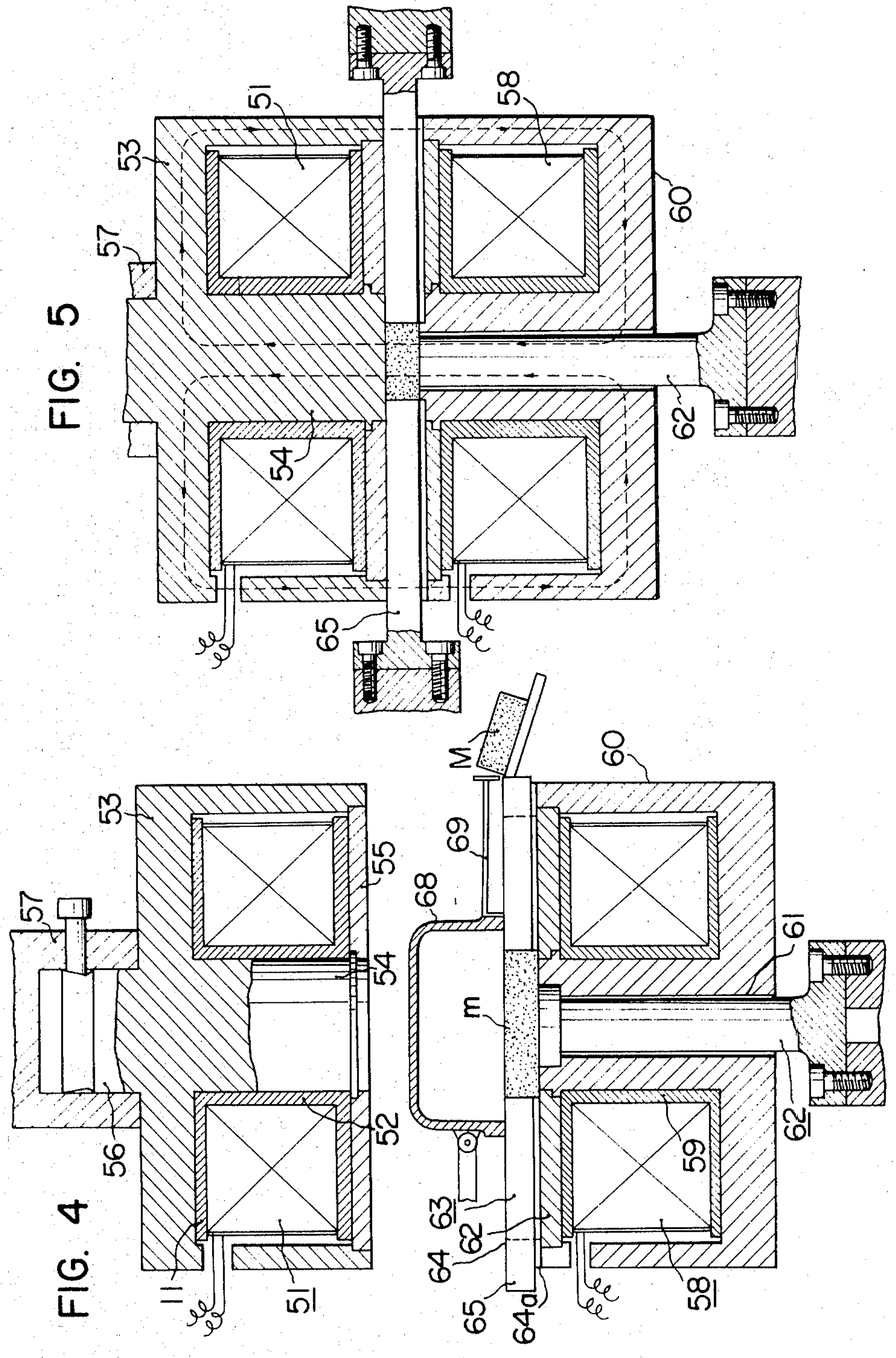
FIG. 4 is a longitudinal section of another modification of this invention wherein upper and lower sections of the molding apparatus are separated.
FIG. 5 shows the embodiment in the molding state.

In operation, after a predetermined quantity of the powder of magnetic material *m*, for example, hard ferrite, has been charged into the mold cavity, the feed box 68 is removed and the upper section is brought into contact with the die assembly as shown in FIG. 5. The coils 51 and 58 are energized in the same direction to create magnet flux which circulates through central leg 54, core 53, annular ring 64*a*, core 60, plunger 62, and the magnetic powder *m* as shown by dotted line arrows in FIG. 5, whereby the particles of the magnetic powder are orientated in the direction of magnetic flux. Different from previous embodiments, plunger 62 is not used to compress the powder but is merely held in the position shown in FIG. 5. Then die pieces 65 are simultaneously forced inwardly by means of hydraulic cylinders or mechanical means until their inner ends define a circle together with arcuate surfaces 68. Then the particles of the magnetic material which have been aligned in the direciton of magnet flux are molded while maintaining their desired orientation. After molding, the upper section is raised, and then the plunger 62 is raised slightly to push the molded magnet M out of the mold cavity. The molded magnet is then removed from the molding apparatus when feed box 68 is advanced during the next cycle.

Magnets manufactured by the above described embodiments of the invention are magnetized in their axial direction. However, as is well known in the art, magnets magnetized in the radial direction are also desirable. The following embodiments are suitable for this purpose.

Figures 9, 10:
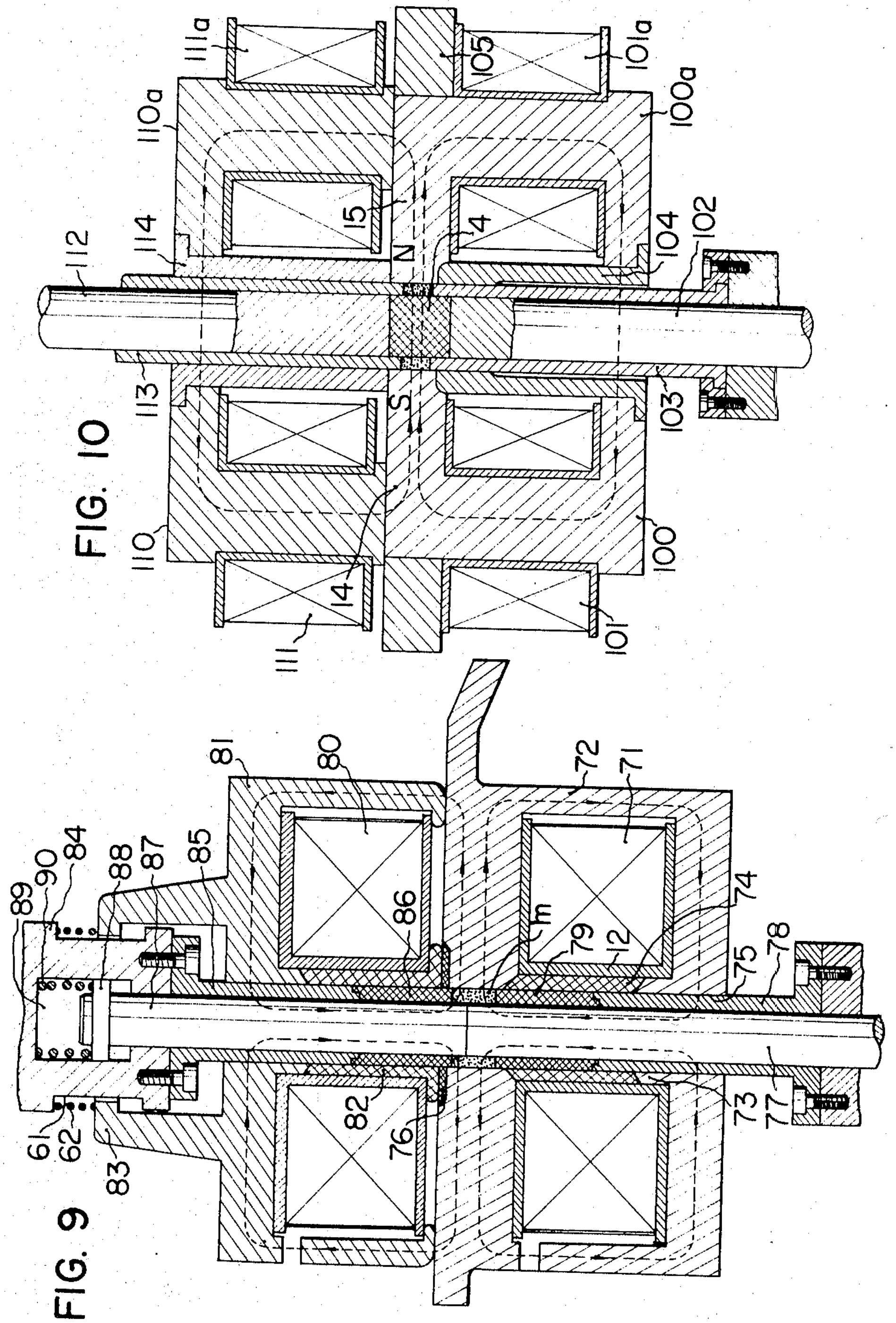
FIG. 9 is a longitudinal section of still further embodiment of this invention to produce magnets magnetized in the radial direction.
FIG. 10 is a longitudinal section of a modified molding apparatus suitable for producing magnets having discrete poles.

The lower section of the molding apparatus shown in FIG. 9 comprises an exciting coil 71 surrounded by a core 72 of magnetic material having a hollow central leg 73 extending through the window of the coil. Substantially the entire length of central leg 73 is made of non-magnetic material as shown by cross hatching 74. Around the upper end of a central bore 75 in the hollow central leg is placed a disc 76 of non-magnetic mateiral. A core rod 77 is inserted in central bore 75 concentrically therewith but spaced therefrom. A lower die member in the form of a cylinder 78 is slidably fitted over core rod 77, the upper portion 79 of the lower die member being made of non-magnetic material. The upper end of the lower die member is normally positioned at a level lower than the upper surface of the upper yoke of core 72, and the upper end of core rod 77 is maintained at the same level as the upper surface of the yoke to define a mold cavity, into which are charged magnetic particles *m* to be molded.

The upper section comprises an annular exciting coil 80 surrounded by a core 81 made of magnetic material covering the upper surface and the outer periphery of a coil 80. The lower portion 82 of the hollow central leg of the magnetic core is made of non-magnetic material. The lower side of coil 80 is left open, as shown, or may be covered by a non-magnetic annular ring, not shown. A cylindrical projection 83 is formed on the upper surface of core 81 to receive an upper die operating member 84. An upper cylindrical die member 85 is connected to die operating member 84 to slide vertically in the central bore of central leg 82. The lower portion 86 of upper die member 85 is also made of non-magnetic material. A core rod 87 is slidably received in the upper cylindrical die member. A flange 88 is secured to the upper end of core rod 87 which is received in a cavity 89 in the die operating member 84 and is normally biased downwardly to engage lower core rod 77 by a spring 90.

In operation, the upper section including coil 80, core 81, upper die member 85, and core rod 87 is raised to separate from the lower section. Then magnetic powder *m* 15 is charged into the mold cavity by means of a feed box similar to those shown in previous embodiments, and then the upper section is lowered to the position shown in FIG. 9 to cooperate with the lower section. Exciting coils 71 and 80 are emergized by currents of opposite polarity whereby magnetic flux flows radially and outwardly through the magnetic material contained in the mold cavity as shown by dotted line arrows. As a result, the particles of the magnetic powder are orientated in the radial direction.

In this regard, during this process, portions 74, 79, 82 and 86 of non-magnetic material act to force the magnetic act to force the magnetic flux to flow axially through core rods 77 and 87 and then radially through the magnetic powder and the upper yoke of core 72. Thereafter a pressure is applied upon upper and lower die members 78 and 85 to mold the magnetic powder while they are radially orientated by the magnetic flux. Thus, this embodiment provides molded magnets magnetized in the radial direction.

Annular magnets prepared by the molding apparatus shown in FIG. 9 have N and S poles uniformly distributed along the inner and outer peripheries of the annuluses.

The embodiments shown in FIGS. 10 to 15 are suitable for preparing annular or arcuate segmental magnets having discrete poles.

Figure 11:
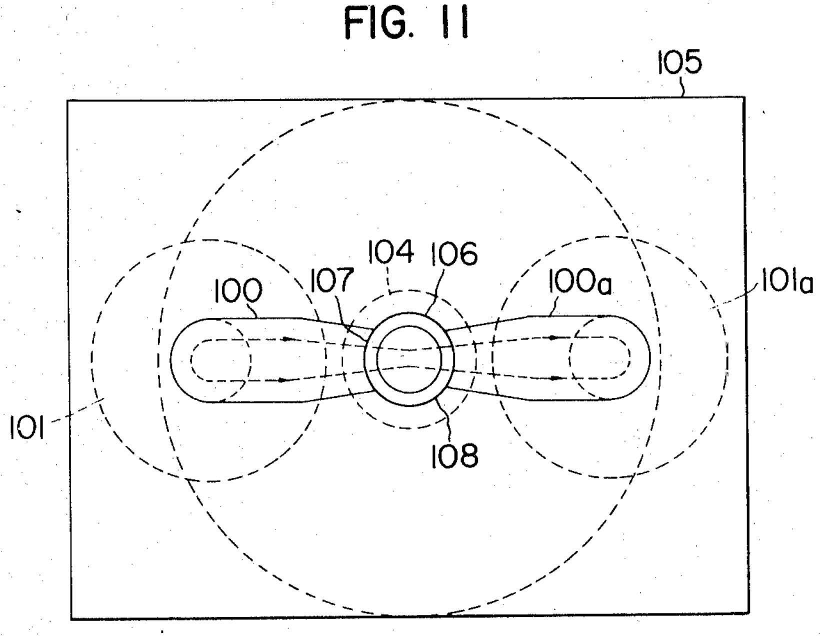
FIG. 11 is a plan view of the lower section of the molding apparatus shown in FIG. 10.

In the embodiment shown in FIGS. 10 and 11, instead of cup-shaped magnetic cores, a plurality of C-shaped magnetic cores are utilized for the separable upper and lower sections of the molding apparatus. As shown in FIGS. 10 and 11, the lower section comprises a pair of opposed C-shaped magnetic cores 100 and 100*a*, a pair of exciting coils 101 and 101*a*, respectively wound upon the vertical legs of these cores, a core rod 102 disposed in the air gap between poles of the upper yokes of the cores, and a cylindrical die member 102 slidably fitted on the core rod. A cylindrical bushing 104 is provided at the inner end of the cores to guide the die member. Upper portions of the die member and bushing are preferably made of non-magnetic material as shown by cross-hatching to confine the magnetic flux to a radial flow across the mold cavity to be described later. A table 105 of non-magnetic material having slots to receive upper yokes of the cores and to define an annular space or mold cavity 106 between arcuate poles 107 and 108 of the yokes and core rod 102 may be provided.

The construction of the upper section is substantially identical to that of the lower section and comprises a pair of C-shaped magnetic cores 110 and 110*a*, a pair of exciting coils 111 and 111*a*, a magnetic core rod 112, a cylindrical die member 113, and a cylindrical bushing 114. The lower portions of the die member and bushing are made of non-magnetic material.

In operation, while the upper section is raised, a powder of magnetic material such as barium ferrite is charged into mold cavity 106. Then the upper section is mounted on the lower section with cores 100 and 110 and 100*a* and 110*a*, vertically aligned respectively. Thereafter coils 101, 101*a*, 111 and 111*a* are energized with currents of such polarities as to cause magnetic flux to flow radially across the mold cavity. As shown in FIG. 11, since poles 107 and 108 are limited to portions of the periphery of the annular mold cavity 106, the particles of the magnetic powder interposed between the poles are orientated in the direction of the magnetic flux that flows thereacross as shown by dotted line arrows in FIG. 10. Then, pressure is applied to upper and lower die members 113 and 103 to compress and mold the magnetic powder.

An annular permanent magnet thus molded has discrete N and S poles at portions corresponding to the poles of the yokes of the cores. If it is desired to mold segmental magnets, non-magnetic arcuate pieces may be inserted in the mold cavity at portions not facing poles 107 and 108.

Figure 12:
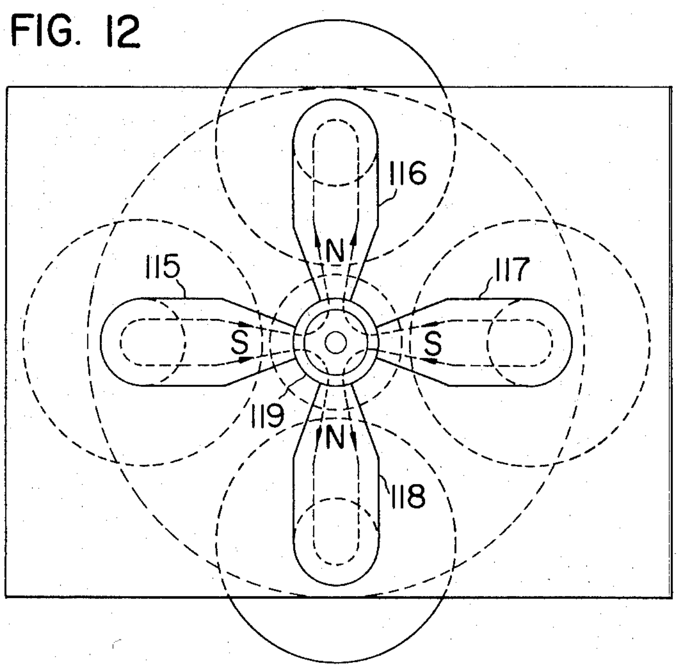
FIGS. 12 and 13 are plan views similar to FIG. 11 but showing modified arrangements of magnetic cores.

In the modification shown in FIG. 12 four C-shaped magnetic cores 115, 116, 117, and 118 with alternate polarity are disposed around a mold cavity 119 so that the molded magnet is provided with four discrete poles of alternate polarity.

Figure 13:
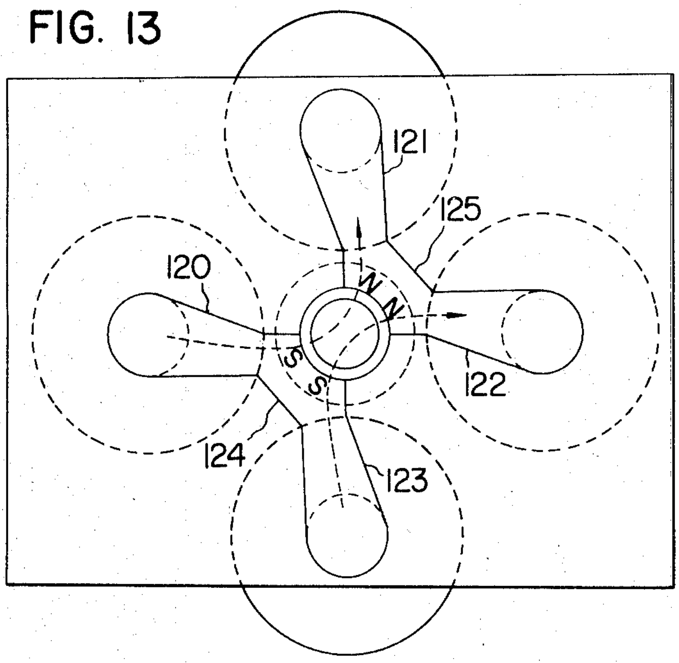

In a modified arrangement shown in FIG. 13, adjacent poles of the same polarity of magnetic cores 120, 121, 122 and 123 are connected by magnetic bridging members 124 and 125 so that the annular magnet molded will have discrete N and S poles.

Figure 14:
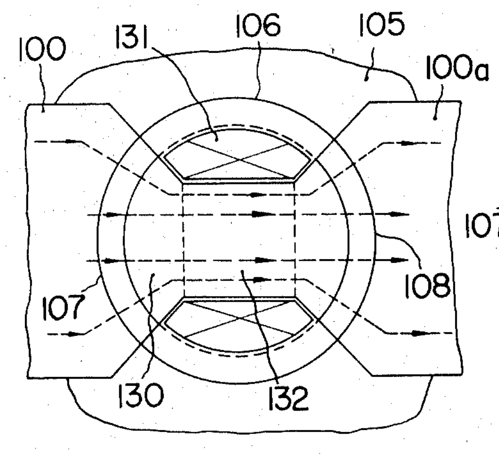
FIG. 14 is an enlarged partial plan view showing a modified construction of the core rod shown in FIGS. 10 and 11.
Figure 15:
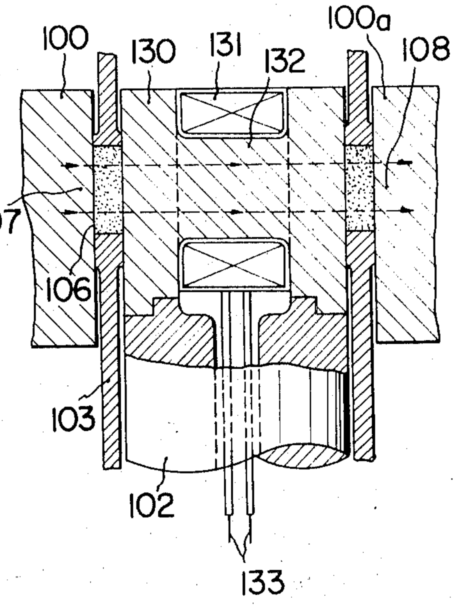
FIG. 15 is a partial sectional view of the part shown in FIG. 14.

FIGS. 14 and 15 show modified construction of the upper end of the lower core rod. In this case the upper end 130 of lower core rod 102 is formed like a bobbin, and an additional exciting coil 131 is wound around the reduced diameter portion 132 thereof to provide an additional magnetomotive force to act additively to those created by exciting coils 111 and 111*a* (FIG. 10). With this construction, flux leakage between poles 107 and 108 can be effectively prevented, so that the flux is highly concentrated at the magnetic powder contained in the mold cavity 106. Further, by proper design of the upper end 130, the flux is caused to flow radially across the mold cavity, thus improving the magnetic characteristics of the molded permanent magnet. Lead wires 133 for coil 131 are passed through lower core rod 102.

While this invention has been shown and described in connection with some preferred embodiments thereof it should be understood that this invention is not limited thereto and includes any modifications and alternations as fall within the true spirit and scope of the invention as defined in the appended claims.

I claim:

1. A compacting apparatus for magnetic powder comprising: separable upper and lower sections, each of said sections including at least one exciting coil and a magnetic core surrounding said coil; a die member, said magnetic core of said lower section and said die member defining a mold cavity near the upper end of said lower section to contain magnetic powder, said upper section being removably mounted upon said lower section to form a closed magnetic circuit around said mold cavity; means to excite said coils of the upper and lower sections to create magnetic flux through said mold cavity to orient the particles of said magnetic powder in the direction of said magnetic flux; and means to apply pressure to said die member to mold said magnetic powder while the particles thereof are oriented in the direction of the magnetic flux.

2. A compacting apparatus for magnetic powder comprising: separable upper and lower sections, each of said sections including an annular exciting coil and a magnetic core surrounding said coil and including a cylindrical central leg with an axial bore and a die member reciprocable and said bore, the upper portion of said axial bore and the die member of the lower section defining a mold cavity near the upper end of said lower section to receive magnetic powder therein, said upper section being removably mounted on said lower section to form a closed magnetic path around said mold cavity; means to energize said exciting coils to create magnetic flux flowing through said magnetic path to orient the particles of said magnetic powder contained in said mold cavity; and means to apply pressure to said die members to mold said particles while they are oriented in the direction of said magnetic flux.

3. The compacting apparatus according to claim 2 wherein said exciting coils of the upper and lower sections are energized in the same direction to axially magnetize said magnetic powder contained in said molding cavity.

4. The compacting apparatus according to claim 1 wherein said lower section further comprises an upper yoke of non-magnetic material which cooperates with said magnetic core to enclose said coil and said yoke has a central bore therein defining said mold cavity.

5. The compacting apparatus according to claim 2 which further comprises means to admit compressed gas into said mold cavity to fluidize the magnetic powder contained therein.

6. The compacting apparatus according to claim 5 wherein said means for admitting compressed gas to said mold cavity comprises conduits extending through said die members.

7. The compacting apparatus according to claim 5 wherein said means for admitting compressed gas to said mold cavity comprises conduits provided in said central legs.

8. A compacting apparatus for magnetic powder comprising: separable upper and lower sections, said upper section including a first annular exciting coil, and a first magnetic core, said core covering the outer periphery and the upper surface of said first coil and having a solid central leg extending through the window of said first coil, said lower section including a second annular exciting coil, and a second magnetic core, said second core covering the outer periphery and the lower surface of said second coil and a plunger extending through said second coil; a die assembly mounted upon said lower section, said die assembly including a die holder having a central opening and a plurality of radial slots and a plurality of die pieces slidably received in said slots, said central opening, said plurality of die pieces, said central leg of said first casing, and said plunger defining a mold cavity to receive magnetic powder; means to energize said first and second coils to create magnetic flux circulating through said first and second cores, the central leg of said first core, and said plunger whereby to orientate the particles of said magnetic powder contained in said mold cavity in the direction of said magnetic flux; means to move said die pieces radially inwardly to compress and mold said orientated magnetic powder; and means to move said plunger to remove the resulting molded magnet.

9. The compacting apparatus according to claim 8 wherein said die holder and said die pieces are made of non-magnetic material, and said holder is surrounded by an anuular ring of magnetic material.

10. The compacting apparatus according to claim 8 wherein said central opening of said die holder has circular configuration, said die pieces are arranged in diametrically opposed relationship with respect to said central opening, and the inner end of each of said die pieces has an arcuate configuration of the same radius as said central opening.

11. The compacting apparatus according to claim 8 wherein said central opening of said die holder has a square configuration, and said die pieces are arranged at right angles with respect to opposed sides of said square opening.

12. A compacting apparatus for magnetic powder comprising: separable upper and lower sections, said upper section including a first annular exciting coil, a first magnetic core covering the outer periphery and the upper surface of said first coil and having a hollow central leg extending through the window of said first coil, a first core rod of magnetic material disposed in said hollow central leg concentrically therewith but spaced apart therefrom, and a first cylindrical die member slidably received between said hollow central leg and said first core rod, said lower section including a second annular exciting coil a second magnetic core totally enclosing said second coil and having a second hollow central leg extending through the window of said second coil, a second core rod of magnetic material disposed in said second hollow center leg concentrically therewith but spaced apart therefrom, and a second cylindrical die member slidably received between said second core and said second hollow central leg, said second core, said second core rod, said second die member, and said first die member defining a mold cavity to contain magnetic powder; means to energize said first and second exciting coils to produce magnetic fluix of opposite polarity so that said magnetic flux flows radially through said magnetic powder contained in said mold cavity to radially orientate the particles of the magnetic powder; and means to operate said first and second die members to mold said radially orientated powder.

13. The compacting apparatus according to claim 12 wherein the inner ends of said first and second die members and of the central legs of said first and second magnetic cores are made of non-magnetic material to cause the magnetic flux to pass longitudinally through said core rods, and radially through said mold cavity and the upper yoke of said second magnetic core.

14. A compacting apparatus for magnetic powder comprising: separable upper and lower sections, said lower section including a core rod, a plurality of C-shaped magnetic cores disposed around said core rod with their inner poles spaced apart from said core rod, a plurality of exciting coils associated with respective magnetic cores, and a cylindrical die member slidably disposed between said core rod and the poles of said cores, said core rod, said magnetic cores, and said die member defining a mold cavity to contain magnetic powder, said upper section including a second core rod, a plurality of inverted L-shaped magnetic cores with the inner ends of their horizontal arms spaced apart from said core rod, a plurality of second exciting coils associated with respective L-shaped magnetic cores, and a second cylindrical die member slidably disposed between said second core rod and the horizontal arms of said L-shaped magnetic cores, said upper section being removably mounted upon said lower section with their corresponding magnetic cores aligned in the vertical direction to form substantially closed magnetic circuits around said coils of the upper and lower sections; means to excite said coils of said upper and lower sections so as to create magnetic flux flowing across said mold cavity in the radial direction with respect to the axes of said core rods; and means to apply pressure to said die members to mold the particles of said magnetic powder while they are orientated in the radial direction.

15. The compacting apparatus according to claim 14 wherein a non-magnetic table is provided for said lower section, said table being provided with a slot to receive the upper yokes of said C-shaped magnetic cores and to encircle the upper end of said core rod of said lower section.

16. The compacting apparatus according to claim 14 wherein the upper yokes of said C-shaped magnetic cores have magnetic poles of alternate polarities so that the molded annular magnet will have discrete magnetic poles of opposite polarities.

17. The compacting apparatus according to claim 14 wherein adjacent pairs of upper yokes of said C-shaped magnetic cores have magnetic poles of the same polarity and magnetic bridge members are provided to bridge pairs of yokes of the same polarity.

References Cited

UNITED STATES PATENTS

| | | | |
|---|---|---|---|
| 2,384,215 | 9/1945 | Toulmin. | |
| 2,999,271 | 9/1961 | Falk et al. | 18—16.5X |
| 3,085,291 | 4/1963 | Haes et al. | |
| 3,189,667 | 6/1965 | Buttner et al. | |
| 3,234,598 | 2/1966 | Quinn | 18—16M |
| 3,250,831 | 5/1966 | Hooper. | |
| 3,264,716 | 8/1966 | Silver. | |
| 3,274,303 | 9/1966 | Muller | 18—16.5X |
| 3,416,191 | 12/1968 | Richter et al. | 18—16.5 |
| 3,452,121 | 6/1969 | Cochardt et al. | 18—16.5 |

J. HOWARD FLINT, Jr., Primary Examiner

U.S. Cl. X.R.

18—5; 264—24